2,797,980

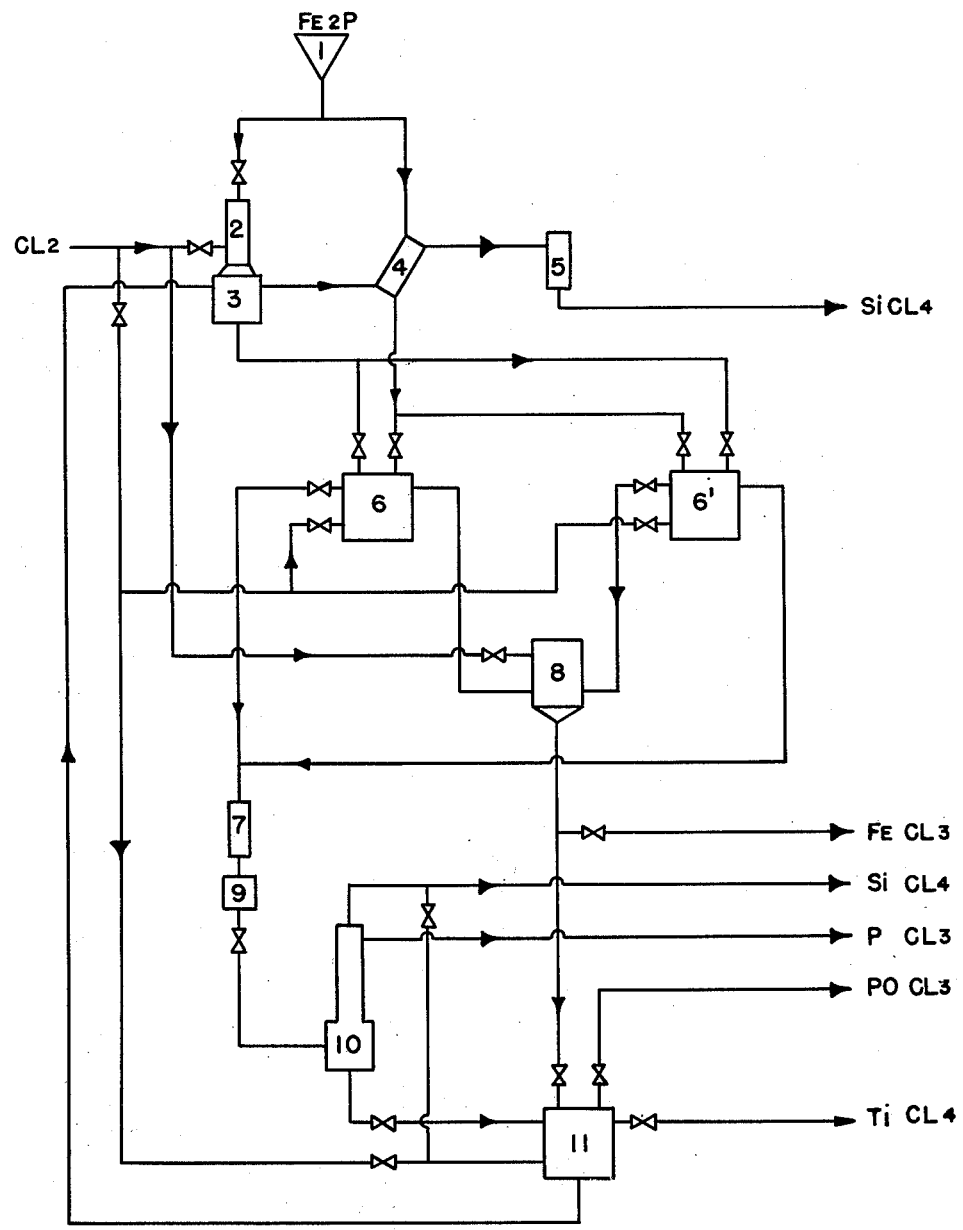

PROCESS OF RECOVERING THE CHLORIDES OF IRON, PHOSPHORUS, SILICON, AND TITANIUM FROM FERRO-PHOSPHORUS

Gerhard Barth-Wehrenalp, Elkins Park, and Alexander Kowalski, Levittown, Pa., assignors to The Pennsylvania Salt Manufacturing Company, Philadelphia, Pa., a corporation of Pennsylvania Application July 5, 1955, Serial No. 519,726

10 Claims. (Cl. 23—87)

This invention relates to the chlorination of ferrophosphorus, and more particularly to the production and separation of the chlorides of substantially all the economically important elements contained in ferrophosphorus.

The term "ferrophosphorus" is used in its broad sense. By ferrophosphorus is meant, a mixture of iron phosphides, such as $Fe_3P$, $Fe_2P$, $FeP$, $FeP_2$ and possibly others. It might even be considered as a continuous series, or a solid solution, in which the iron and phosphorus are present in any proportion. Ferrophosphorus is generally obtained as a by-product of the phosphate industry. Other elements besides the iron and phosphorus are usually present in the ferrophosphorus in substantially smaller amounts; among these, titanium and silicon are generally present in amounts of about 0.5 to 1.6% and 1.5 to 6% respectively. Commercially available ferrophosphorus is graded according to its phosphorus content, which may vary from 15 to 30%, and generally is present in amounts of about 22 to 26%, corresponding roughly to the formula $Fe_2P$. Any grade of ferrophosphorus is suitable in practicing the present invention, low grades, with phosphorus contents of less than 20%, having been used with excellent success.

In co-pending application Ser. No. 520,107, filed July 5, 1955, the separation of phosphorus, iron and silicon from ferrophosphorus in the form of their chlorides is described. Also in co-pending application Ser. No. 520,105, filed July 5, 1955, the separation of the titanium content of ferrophosphorus in the form of its chloride is described. The present invention is drawn to an integrated process wherein substantially all of the phosphorus, iron, silicon and titanium found in ferrophosphorus are recovered separate from each other.

In the process of the present invention only two relatively cheap raw materials are needed—ferrophosphorus and chlorine. The separation of the various elements present in the ferrophosphorus is effected by taking advantage of the physical properties of certain intermediate products and of the final products themselves. There is no waste in the process, the materials used in one part of the process being returned to the system at another point. This makes possible substantially complete recovery of all the valuable elements in ferrophosphorus. An additional advantage to the process of the present invention is that the exothermic nature of the reactions involved is fully utilized, very little additional heat being necessary. The advantage of this is apparent when it is considered that the reactions themselves all take place at temperatures higher than 100° C., and some take place at 300° C. or higher.

In practicing the present invention, ferrophosphorus is first fully chlorinated under conditions such that the chlorination product is substantially separated from the ferrophosphorus as it is formed. The chlorination product is stored, preferably in liquid form and periodically supplied to a reaction chamber, together with fresh ferrophosphorus, at a temperature suitable for the distillation of crude phosphorus trichloride. The residue after removal of phosphorus trichloride is chlorinated with excess chlorine at a temperature suitable for the distillation of pure ferric chloride.

In the chlorination of ferrophosphorus, which is preferably carried out at elevated temperatures, silicon tetrachloride, titanium tetrachloride and phosphorus oxychloride are formed and given off as vapors. The silicon tetrachloride vapor can be separated from the titanium tetrachloride and phosphorus oxychloride by contacting these vapors with a bed of ferrophosphorus as hereinafter described. Most of the vapors condense on the ferrophosphorus at the temperature employed, and silicon tetrachloride passes through in substantially pure state. The ferrophosphorus used in the bed, and thereby enriched with the more volatile chlorides, is conveniently used as a source of ferrophosphorus for the production of the phosphorus trichloride.

The crude phosphorus trichloride is purified by fractional distillation, with some additional silicon tetrachloride being recovered in the low boiling fraction, and phosphorus trichloride at higher temperature. The residue, which contains substantially all of the titanium in the form of a complex of titanium tetrachloride and phosphorus oxychloride, formed in the reaction is treated with chlorine and phosphorus trichloride, which replaces and thereby releases the phosphorus oxychloride in the complex, at a temperature suitable for the distillation of pure phosphorus oxychloride. The residue after removal of the phosphorus oxychloride is then treated with ferric chloride, which replaces and releases the titanium tetrachloride, at a temperature suitable for the removal of titanium tetrachloride by distillation. The final residue, which consists essentially of a complex of ferric chloride and phosphorus pentachloride is combined with the chlorination product resulting from the chlorination of ferrophosphorus, and the cycle is repeated.

The process of the present invention can best be described by reference to the flow diagram shown in the accompanying drawing.

Referring to the drawing, the ferrophosphorus, preferably in lump form, from storage chamber 1 is fed into chlorinator 2 where it is reacted with substantially anhydrous chlorine to completely chlorinate all of the reactive material in the ferrophosphorus. The reaction is initiated at temperatures of about 200° C. but is preferably carried out at temperatures of about 500° C. to 1200° C. Temperatures above 1200° may be used, the ferrophosphorus melting at about 1300° C. The chlorination is preferably carried out on a grate, or in some other manner such that the chlorinated product as formed is passed from the chlorination chamber 2 to the storage vessel 3. The products of chlorination are primarily a ferric chloride-phosphorus pentachloride complex having the formula $(FeCl_3)_2 \cdot PCl_5$ described in co-pending application Ser. No. 520,107, cited above, and a small quantity of gaseous material consisting primarily of silicon tetrachloride and a titanium tetrachloride-phosphorus oxychloride complex mixture, such as that described in co-pending application Ser. No. 520,105, cited above.

These gaseous materials are passed through a rotating bed 4, which contains a moving mass of finely-divided ferrophosphorus. The titanium tetrachloride-phosphorus oxychloride complex mixture is condensed on the ferrophosphorus in rotating bed 4, which is maintained at a temperature of 56° to 140° C., while the major portion of the silicon tetrachloride vapor passes on through and is condensed in condenser 5.

The hot ferric chloride-phosphorus pentachloride complex from storage vessel 3 is fed with ferrophosphorus from rotating bed 4 into reactor 6, where the complex and ferrophosphorus react at a temperature of 270° to 486° C. to release phosphorus trichloride, which is passed to condenser 7 and treated as hereinafter described. The ferrophosphorus and complex reacted in reactor 6 are preferably in such proportions that the ferrophosphorus is present in at least the required molar amounts to release all of the phosphorus present in the form of phosphorus trichloride and preferably present in a slight excess.

These amounts can readily be determined in accordance with the following equations:

(1) 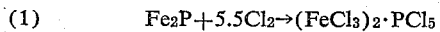

$$Fe_2P + 5.5Cl_2 \rightarrow (FeCl_3)_2 \cdot PCl_5$$

(2) 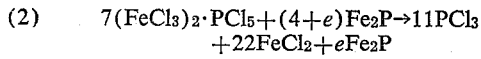

$$7(FeCl_3)_2 \cdot PCl_5 + (4+e)Fe_2P \rightarrow 11PCl_3 + 22FeCl_2 + eFe_2P$$

wherein $e$ is any small amount greater than 0. For convenience, the ratio of iron to phosphorus most commonly encountered in commercially available ferrophosphorus can be expressed by the formula $Fe_2P$. The formula $Fe_2P$ has been used to illustrate the balance of materials; however, it will be apparent that adjustments in the above equations may be made to accommodate any other ratio of iron to phosphorus.

After the reaction of the ferric chloride-phosphorus pentachloride complex with the ferrophosphorus has been completed, chlorine is admitted into the reactor 6 to chlorinate the residue. The chlorine is substantially anhydrous chlorine, and is preferably used in excess amounts, the chlorination being carried out at a temperature of 315° to 486° C. In this reaction it is necessary to add some heat to maintain the reactor at this temperature. The ferric chloride formed during this chlorination step is passed to sublimation chamber 8 where it is condensed and from which it can be removed and packaged. In this step, the small excess of ferrophosphorus used in the previous step is fully chlorinated to form the ferric chloride-phosphorus pentachloride complex and remains in reactor 6 after the ferric chloride is distilled. The complex remaining in reactor 6 is combined with fresh complex from storage chamber 3 and ferrophosphorus from rotating bed 4, and phosphorus trichloride is again produced as previously described.

While the chlorination is proceeding in reactor 6, ferric chloride-phosphorus pentachloride complex from storage chamber 3 and ferrophosphorus from rotating bed 4 are charged into reactor 6' in the same manner in which they were originally charged into reactor 6. The charge of complex and ferrophosphorus is then reacted in reactor 6' as previously described for reactor 6, the phosphorus trichloride released being passed to condenser 7 as previously described. In this way reactors 6 and 6' are alternately used for reacting complex with ferrophosphorus or chlorinating the residue from said reaction so that the process is essentially continuous.

The phosphorus trichloride and other vapors present therewith, which include any silicon tetrachloride not previously removed and substantially all of the titanium tetrachloride-phosphorus oxychloride complex, are condensed in condenser 7, and the condensate stored in storage vessel 9. The condensate is then passed from storage vessel 9 to a fractional distillation apparatus 10, wherein the phosphorus trichloride and silicon tetrachloride are separated from the titanium tetrachloride phosphorus oxychloride complex. The silicon tetrachloride separates in the low-boiling fraction at a temperature of 56° C. whereas the phosphorus trichloride is separated in the fraction boiling at 76° C. The residue consists of the titanium tetrachloride-phosphorus oxychloride complex.

The titanium tetrachloride-phosphorus oxychloride complex mixture is then passed into reactor 11 where it is reacted with phosphorus pentachloride which is obtained either by first combining some of the phosphorus trichloride obtained from the fractional distillation column 10 with chlorine or by passing the phosphorus trichloride and chlorine directly into the reactor 11. This reaction is carried to completion at a temperature of 85° to 140° C., and the phosphorus oxychloride is then distilled off at a temperature of about 107° to 239° C. The residue which consists of a complex of titanium tetrachloride and phosphorus pentachloride is mixed with ferric chloride obtained from sublimation chamber 8 and the ferric chloride and titanium tetrachloride-phosphorus pentachloride complex is then heated to 100° to 239° C., and the titanium tetrachloride released is distilled off at a temperature of about 136° to 486° C. The residue is a complex of ferric chloride and phosphorus pentachloride which is essentially the same as that stored in storage vessel 3 and is accordingly returned to this vessel.

If desired, a single reactor may be used in place of the two reactors 6 and 6'; however, it is apparent that in such a case the process would not be continuous since it would be necessary to wait until either the reaction between the ferric chloride-phosphorus pentachloride complex and ferrophosphorus had been completed or the reaction wherein the residue was chlorinated to produce ferric chloride had been completed before the next step could be taken.

Though in the modification described, the phosphorus trichloride, silicon tetrachloride and titanium tetrachloride and phosphorus oxychloride are all condensed in the condenser 7 and then later separated by fractionation, in the preferred process only a partial condensation at 7 would occur. At this point only the titanium tetrachloride and phosphorus oxychloride would be condensed and the condensate passed directly to the reactor 11. The gaseous phosphorus trichloride and silicon tetrachloride would then be passed to another partial condenser not shown wherein the phosphorus trichloride would be condensed, thus separating it from the silicon tetrachloride.

When ferrophosphorus is charged into the chlorination chamber 2, it is preferably added in lump form; whereas, when the ferrophosphorus is charged into the rotating bed 4, it is better to have it finely-divided. This finely-divided material is also more suitable for the reaction in which phosphorus trichloride is produced, in reaction chamber 6 or 6'. The degree of comminution of ferrophosphorus is not critical.

It is apparent from the description of the above process that not only is a substantial saving achieved due to the utilization of the heat evolved in the exothermic reactions but that the process gives a self-sufficient system wherein the only raw materials used are the ferrophosphorus and the chlorine; also, by the process a substantially complete recovery and separation of all of the most important elements in the ferrophosphorus is obtained.

In the specification and in the claims the present invention is described as being carried out at atmospheric pressure. As with most chemical reactions, pressures greater or less than atmospheric pressure may be used. If pressures substantially below or above atmospheric pressure are employed it is apparent that the temperature limitations will vary somewhat as would be expected, the temperatures being slightly lower for reduced pressures and slightly higher for higher pressures. Any such variations are intended to be included in the present specification and claims.

Having thus described my invention, I claim:

1. The process of recovering iron, phosphorus, silicon and titanium in the form of chlorides from ferrophosphorus containing silicon and titanium comprising completely chlorinating the ferrophosphorus to convert all of these elements into their chlorides, separating, as vapors, from the iron and phosphorus chloride which forms a complex, the chlorides of silicon, titanium and any phosphorus oxychloride forming during the reaction, heating said complex with at least sufficient ferrophosphorus at a temperature of 270° to 486° C. to release all of the phosphorus in said complex as phosphorus trichloride vapor, chlorinating the residue remaining after release of the phosphorus trichloride vapor at a temperature of 315° to 486° C. to release ferric chloride, collecting said vapors of silicon tetrachloride, titanium tetrachloride and phosphorus oxychloride together with said phosphorus trichloride vapor and then separating the same by fractionation into substantially pure phosphorus trichloride, silicon tetrachloride and a complex of titanium tetrachloride-phosphorus oxychloride, heating said titanium tetrachloride-phosphorus oxychloride complex with sufficient amounts of phosphorus pentachloride, formed by chlorinating said previously prepared phosphorus trichloride, at a temperature of 85° to 140° C. to release all of said phosphorus oxychloride and to form a complex of titanium tetrachloride and phosphorus pentachloride, removing said phosphorus oxychloride and heating said complex of titanium tetrachloride and phosphorus pentachloride with sufficient amounts of said previously prepared ferric chloride at a temperature of 100° to 239° C. to release substantially all of the titanium tetrachloride and form a complex of iron chloride and phosphorus chloride similar to that formed by said chlorination of ferrophosphorus, removing said complex of iron chloride and phosphorus chloride and adding it to complex formed by the chlorination of ferrophosphorus and repeating the process.

2. The process of claim 1 wherein the vapors from the chlorination of the ferrophosphorus are passed over a bed of ferrophosphorus maintained at a temperature of 56° to 140° C. to selectively absorb out the titanium tetrachloride and phosphorus oxychloride in order to separate the silicon tetrachloride therefrom.

3. The process of claim 2 wherein the vapors from the chlorination of the ferrophosphorus are passed over an agitated bed of finely divided ferrophosphorus.

4. The method of claim 1 wherein the ferrophosphorus is chlorinated at temperatures of 200° to 1200° C. and the complex formed by said chlorination is removed as formed.

5. The process of recovering iron, phosphorus, silicon and titanium in the form of chlorides from ferrophosphorus containing silicon and titanium comprising completely chlorinating the ferrophosphorus to form a complex of ferric chloride and phosphorus pentachloride and a vapor mixture of titanium tetrachloride, phosphorus oxychloride and silicon tetrachloride, collecting said complex and storing it in the liquid state at a temperature of 100° to 486° C., separating said silicon tetrachloride by passing said vapor mixture over an agitated bed of finely divided ferrophosphorus maintained at a temperature of 56° to 140° C. which selectively removes the titanium tetrachloride and phosphorus oxychloride, heating said complex to a temperature of 270° to 486° C. with at least molar equivalent amounts of ferrophosphorus including the ferrophosphorus from said silicon tetrachloride separation step to release all of the phosphorus in said complex as phosphorus trichloride, removing as a vapor mixture said phosphorus trichloride together with the titanium tetrachloride, phosphorus oxychloride and any silicon tetrachloride that may be present all of which are vaporized at the reaction temperature, and condensing said vapor mixture, chlorinating the residue remaining after release of the phosphorus trichloride at a temperature of 315° to 486° C. to form ferric chloride vapor, collecting and condensing said ferric chloride vapor, separating by fractionation from said condensed vapor mixture phosphorus trichloride and silicon tetrachloride as substantially pure compounds and separating said titanium tetrachloride and phosphorus oxychloride which form a complex, heating said titanium tetrachloride-phosphorus oxychloride complex at a temperature of 85° to 140° C. with sufficient amounts of phosphorus pentachloride to release all of said phosphorus oxychloride and form a complex of titanium tetrachloride and phosphorus pentachloride, the phosphorus pentachloride used being formed by mixing chlorine with a portion of said separated substantially pure phosphorus trichloride, after release of said phosphorus oxychloride maintaining the reaction mixture at a temperature of 107° to 239° C. to drive off all of said phosphorus oxychloride as a vapor, collecting and condensing said vapor, heating said titanium tetrachloride-phosphorus pentachloride complex at a temperature of 100° to 239° C. together with sufficient previously prepared ferric chloride to release all of the titanium tetrachloride and form a complex of iron chloride and phosphorus chloride similar to that formed by said chlorination of ferrophosphorus, after release of said titanium tetrachloride maintaining the reaction mixture at a temperature of 136° to 486° C. to drive off all of said titanium tetrachloride as a vapor, collecting and condensing said vapor, and adding said complex of iron chloride and phosphorus chloride to the complex formed by the chlorination of further ferrophosphorus and repeating the process.

6. The process of claim 5 wherein said mixture of vapors comprising titanium tetrachloride, phosphorus oxychloride, phosphorus trichloride and silicon tetrachloride is cooled to at least 56° C., to condense all the vapors and the resulting liquid mixture separated by fractional distillation, the silicon tetrachloride being removed in the low-boiling fraction at a temperature of about 56° C. and the phosphorus trichloride being separated in the fraction boiling at about 76° C. and the titanium tetrachloride and phosphorus oxychloride remaining in the residue in the form of a complex.

7. The process of claim 5 wherein said mixture of vapors comprising titanium tetrachloride, phosphorus oxychloride, phosphorus trichloride and silicon tetrachloride is cooled to a temperature of 140° C. to condense out the titanium tetrachloride and phosphorus oxychloride as a complex, removing said complex and then further cooling the remaining vapors to a temperature of about 76° C. to condense out the phosphorus trichloride, removing said condensed phosphorus trichloride and then further cooling the remaining uncondensed gases to a temperature of about 56° C. to condense out the silicon tetrachloride.

8. The process of claim 5 wherein said complex formed by chlorinating ferrophosphorus is stored as a liquid, in a container at a temperature of 100° to 486° C. and two reactors are used to carry out the reaction of said complex with ferrophosphorus and the chlorination of the residue of said reaction between said complex and ferrophosphorus after removal of the phosphorus trichloride formed, said reactors being operated simultaneously each alternately first being used to react complex from said container with ferrophosphorus and then being used to chlorinate the residue.

9. The method of separating silicon tetrachloride from a mixture of vapors containing titanium tetrachloride, phosphorus oxychlorine and silicon tetrachloride comprising passing said mixture of vapors over an agitated bed of finely divided ferrophosphorus maintained at a temperature of 56° to 140° C. whereby said vapors of titanium tetrachloride and phosphorus oxychloride are selectively removed by said ferrophosphorus.

10. The process of claim 9 in which said bed of ferrophosphorus is rotated.

References Cited in the file of this patent
UNITED STATES PATENTS

| | | |
|---|---|---|
| 1,848,813 | Woodstock et al | May 8, 1932 |
| 1,859,543 | Urbain | May 24, 1932 |